Oct. 29, 1957
H. A. TINTES
2,811,239
SELF-LEVELING MOTOR MOUNT FOR PORTABLE
GRAIN ELEVATORS AND THE LIKE
Filed Dec. 20, 1952
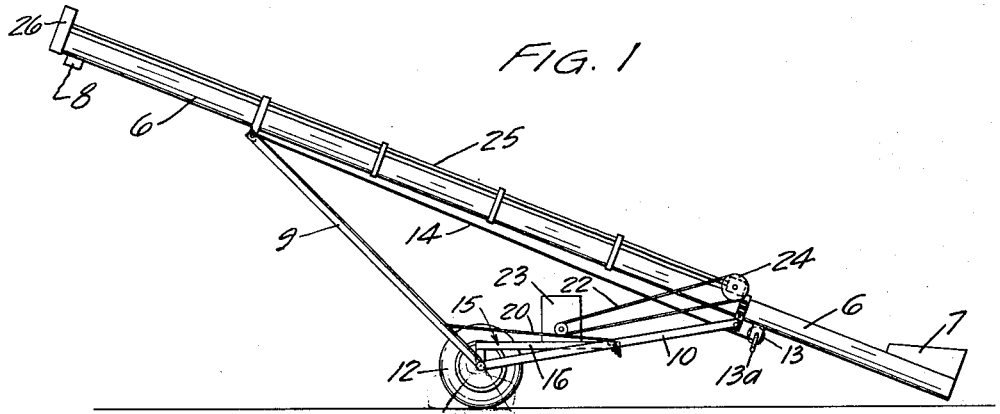
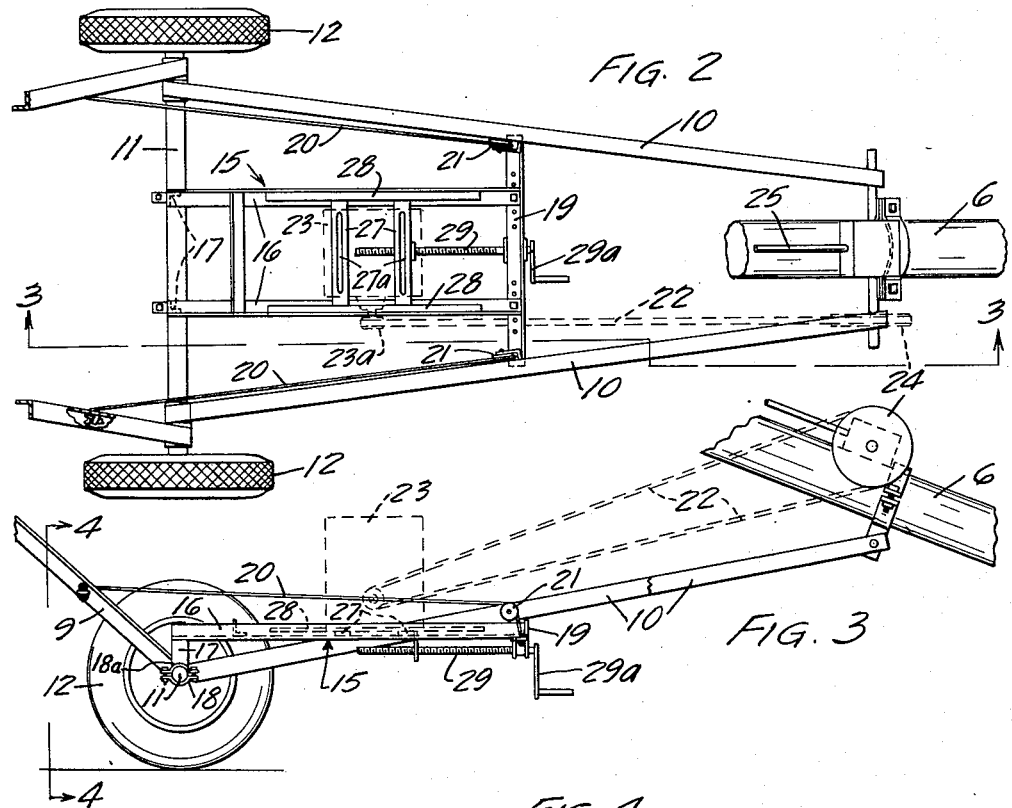
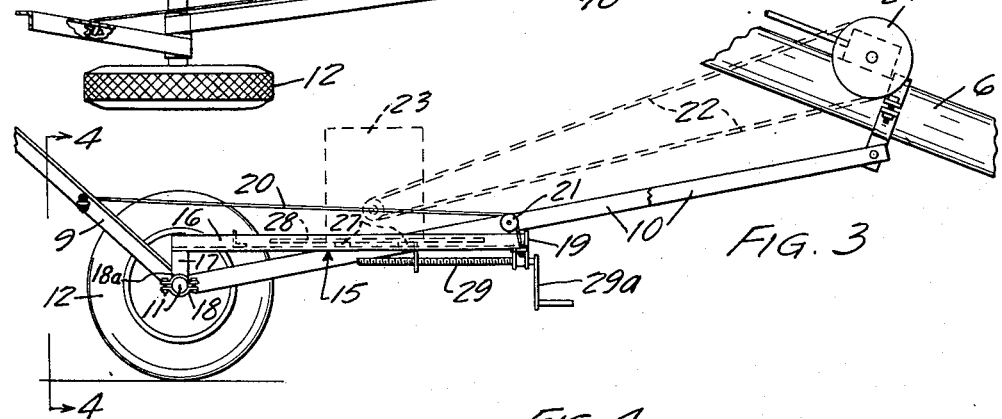
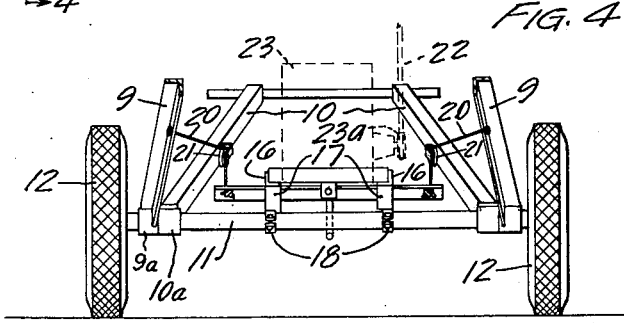
INVENTOR
HUBERT A. TINTES
BY Williamson, Williamson, Schroeder & Adams
ATTORNEYS

United States Patent Office 2,811,239
Patented Oct. 29, 1957

2,811,239

SELF-LEVELING MOTOR MOUNT FOR PORTABLE GRAIN ELEVATORS AND THE LIKE

Hubert A. Tintes, West Fargo, N. Dak.

Application December 20, 1952, Serial No. 327,084

1 Claim. (Cl. 198—120.5)

This invention relates generally to motor mounts for grain elevators and the like and particularly to a self leveling motor mount adapted to be used with a portable grain elevator supporting structure.

For many years, it has been a problem to provide a motor mount for portable grain elevators which will position the motor for easy starting and operational control, but will maintain the motor in substantially level relationship regardless of the angle of inclination of the elevator driven thereby.

It is an object of my present invention to provide a novel and highly efficient self leveling motor mount for grain elevators and the like of the portable type and adapted to support the motor in a convenient location within easy reach of the operator while maintaining said motor in substantially level relationship regardless of the angle of inclination between the ground surface and the elevator structure.

More specifically, it is an object to provide a motor mount for portable grain elevators and loaders having a wheeled axle with pairs of upwardly divergent elevator supporting arms having provision for varying the angle of divergence therebetween, said motor mount being supported at one end on the wheeled axle and having its other end supported by flexible supporting means of a fixed predetermined length, one end of which is connected with said motor mount and passes therefrom upwardly to guiding means mounted on one of said pairs of divergent elevator supporting arms and extending across to an intermediate portion of the other pair of supporting arms and fixed thereto to maintain said motor mount in substantially level position regardless of the angle of divergence between said two supporting arms.

It is a further object to provide a self leveling motor mount to portable elevators and the like having one end of said mount disposed in fixed relation and the other end thereof connected with means for maintaining the same in substantially level relation regardless of the angle of inclination of the elevator and including means for adjusting longitudinally thereof the position of the motor mounted thereon to maintain a driving tension between the motor and the driving connection with the elevator.

These and other objects and advantages of my invention will more fully appear from the following description made in connection with the accompanying drawings wherein like reference characters refer to the same or similar parts throughout the several views and in which:

Fig. 1 is a side elevational view of a portable grain elevator with the near wheel removed and showing my new self leveling motor mount connected therewith;

Fig. 2 is a somewhat enlarged top plan view of my self leveling motor mount and the respective portions of the elevator supporting structure to which the same is connected;

Fig. 3 is a vertical sectional view of the structure shown in Fig. 2 taken substantially along the line 3—3 of Fig. 2; and Fig. 4 is a fragmentary vertical sectional view taken substantially along the line 4—4 of Fig. 3.

As illustrated in the accompanying drawing, I provide a conventional auger type elevator tube 6 having the inlet hopper 7 at the lower end thereof and the discharge spout 8 at the upper end thereof.

A lifting arm structure comprising a pair of spaced oppositely disposed outwardly converging arms 9 and a reach arm structure consisting of a pair of spaced oppositely disposed outwardly converging arms 10 are provided for supporting said auger tube 6 and are respectively mounted at their inner ends on a transversely disposed axle 11 which has a pair of wheels 12 respectively journalled thereon for carrying the same. The lifting arm structure extends outwardly in a rearward direction from axle 11 and the reach arm structure extends outwardly in a forward direction from said axle. The pairs of supporting arms 9 and 10 are swingably mounted on said axle. As shown the pairs of supporting arms have at their inner ends connector sleeves designated respectively 9a and 10a which rotatably engage the axle. The rear arms 9 are conventionally and is slidably mounted at its upper end for shifting movement longitudinally of said tube 6. A winding drum 13 is mounted on the lower portion of tube 6 and a cable 14 has its upper end connected with the outer end portion of the lifting arm structure 9 and its lower end wound on said drum 13. A crank 13a is provided for shifting the lifting arm structure 9 along the tube 6 to adjust the elevation of the discharge spout 8 by controllably varying the angulation of the lifting arm structure 9 and auger tube 6.

A motor mounting frame, designated as an entirety by the numeral 15, has a pair of longitudinally disposed frame members such as the angle irons 16 mounted at their rear ends on a pair of upstanding mounting struts 17 rigid therewith and as shown each of which are securely clamped to the axle by clamping a bracket comprising two sections 18 and 18a removably secured together, one of the sections being rigid with the strut.

It will be noted that the supporting axis of the motor mounting frame and the pivotal axis of the pairs of supporting arms 9 and 10 are coincident. The forward ends of the two longitudinal frame members 16 are respectively carried by a front cross member 19.

Suitable self leveling means are provided for supporting the front ends of the two frame members, such as the pair of flexible cables 20 fixed at their forward ends to the respective outer end portions of the cross member 19 which carries the front portions of the two frame members 16. Said cables 20 extend respectively upwardly from their transversely spaced connections with said cross member 19 and a pair of guiding sheaves 21 are respectively journalled for rotation on a pair of respectively fixed axes as by being mounted on pivot pins which are carried by intermediate portions of the two members of the forwardly extending arm structure 10, as best shown in Figs. 2 to 4, inclusive. The rear ends of said cables are respectively fixed to intermediate points of the rear supporting arms 9, as by being respectively anchored to the two frame members thereof. Said anchor points are positioned so that movement of the arm structure 9 will produce a very slight change in the elevation of the forward portion of cross bar 19 and this change in elevation will be compensated for by the shifting movement of the intake end of the elevator 7. In the form shown, the portions of cables 20 disposed between the arm structures 9 and 10 are positioned substantially horizontally and remain in substantially horizontal position during adjustment of the elevation of the auger 6. These two cables 20 are of fixed length and work in cooperation with the intake ground supported end of the auger tube 6 to maintain the motor mounting frame 16 in substantially level position for all adjustments of the elevation of said tube 6.

When the angular relation between the arm structures 9 and 10 is varied to control the elevation of the auger 6, the lengths of the substantially horizontally disposed portions of the two cables 20 will of course be varied, but since the lower intake end of the auger will remain in contact with the ground surface, the outer end of the arm structure 10 will of course be elevated. The point of connection with said outer end of arm structure 10 will, together with the position of said two anchor points on arm structure 9, control the amount of shifting movement of the forward end extremity of frame 15 relative to the ground surface and can be easily adjusted to maintain said frame in level position for substantially any degree of elevation of the elevator tube 6.

The motor 23 is mounted on motor support 15 and has a driving pulley 23a driven thereby. Any suitable driving connection such as the belt drive 22 extends between the driving pulley 23a and a shaft driving pulley 24. An elongated longitudinally disposed drive shaft 25 extends upwardly along said auger 6 and is journalled in suitable bearings provided therefor in any conventional manner. The driving pulley 24 and lower end of shaft 25 having any suitable driving connection therebetween and the upper end of shaft 25 drives the auger 6 through suitable gears disposed within a gear housing 26 at the upper end of said tube.

Obviously, whenever the position of the auger is varied, the distance between the driving pulley 23a of motor 23 and the shaft driving pulley 24 will also be varied slightly and therefore suitable easily operable means must be provided for shifting one of said pulleys. Such means are provided for controllably shifting the motor 23 longitudinally of its support 15. The two longitudinal angle irons 16 are positioned with the lower flanges thereof extending inwardly in opposed relation and a pair of transversely disposed spaced substantially parallel slide bars are slidably mounted on said inwardly extending flanges. Inwardly extending guide plates 28 are mounted in fixed relation on the upstanding flanges of frame members 16 in spaced parallel relation above the respective bottom flanges thereof to form a bar retaining track therebetween. Said two transversely disposed slide bars 27 are rigidly interconnected by any suitable means such as the bars of the motor 23 and suitable means for shifting said slide bars and motor are provided such as the screw shaft 29 which, in the form shown, is threadably connected with the front slide bar and is journalled at its forward portion in frame cross bar 19 and is operated by the crank 29a fixed at the forward end thereof. Since the crank and motor are both conveniently mounted in closely spaced relation to the ground surface, it is an extremely simple matter to adjust the belt tension as well as to control and maintain said motor 23. Elongated slots 27a in the slide bars 27 permit limited lateral adjustment of the position of the motor 23 to permit alignment of the pulley wheel 23a and driving pulley 24. If additional adjustment is required, the clamping brackets 18 can be easily loosened on the axle 11 and shifted along said axle into the required position.

It will be seen that I have provided a relatively simple, yet highly efficient, self-leveling motor mount positioned in close proximity to the ground surface for easy operative control and maintenance and which is maintained in substantially horizontal level position regardless of variations in the degree of elevation of the tube 6 by adjusting the angular relation between the two elevator supporting arm structures 9 and 10. Whenever the angle between said arm structures 9 and 10 is reduced, the portion of the cables 20 extending therebetween is shortened but at the same time the vertical portion of said cables is lengthened due to the elevating of the outer end of arm structure 10 and, whenever the angle between said arm structures is reduced, the portion of the cables 20 extending therebetween is lengthened and the upstanding portion of said cables is shortened to maintain said motor mount 15 in substantially horizontal position.

It will, of course, be understood that various changes may be made in the form, details, arrangement and proportions of the parts without departing from the scope of my invention which, generally stated, consists in the matter shown and described herein and set forth in the appended claim.

What I claim is:

A portable grain elevator comprising a wheeled axle, an elongated rigid grain confining tube, means supporting the conveyor tube at an upward inclination transversely of the axle comprising a pair of spaced oppositely disposed outwardly converging arms extending rearwardly from the axle and slidably connected at their outer ends to the rear upper part of the conveyor tube, and a pair of spaced oppositely disposed outwardly converging arms extending forwardly from the axle and pivotally connected at their outer ends to the lower part of the conveyor tube, each of said pairs of arms having connector sleeves at their inner ends fitting around the axle, the connector sleeves of each pair of arms rotatably engaging the axle to provide for swinging movement of said pairs of arms relative to each other to vary the angle of inclination of the conveyor tube, a self-leveling motor mount comprising an elongated frame including spaced side members, vertical struts extending downwardly from the inner ends of said side members rigid therewith and each having at its lower end a clamp removably fitting about the axle and fixedly securing the strut to the axle, the supporting axis of the motor mount frame and the pivotal axis of both pairs of supporting arms being coincident, said clamp comprising two complemental separable sections removably secured together, one of the sections being rigid with the strut, a cross bar rigidly secured to the forward end portions of the side members of the frame with end portions of the cross bar each projecting laterally beyond the same and underlying a portion of one of the forwardly extending supporting arms, a guiding sheave rotatably mounted on each of the forwardly extending supporting arms above an underlying end portion of said cross bar, a pair of flexible cables, each having an intermediate portion thereof trained over one of said guiding sheaves with a dependent portion of the same extending downwardly from the sheave and anchored to one end portion of said cross bar, and each cable extending rearwardly from the sheave and anchored at its rear end to an intermediate portion of one of the rearwardly extending supporting arms at a location so that when the angular relationship of the forward and rear supporting arms is varied, the motor mounting frame will remain in a horizontal position.

References Cited in the file of this patent

UNITED STATES PATENTS 2,583,082    Bobrowski  --------------- Jan. 22, 1952